United States Patent [19]

Brugger

[11] 4,243,649

[45] Jan. 6, 1981

[54] PROCESS FOR THE MANUFACTURE OF ZIRCONIUM OXIDE FROM TECHNICAL CALCIUM ZIRCONATE

[75] Inventor: Wilhelm Brugger, Ratingen, Fed. Rep. of Germany

[73] Assignee: Th. Goldschmidt AG, Essen, Fed. Rep. of Germany

[21] Appl. No.: 96,424

[22] Filed: Nov. 21, 1979

[30] Foreign Application Priority Data

Dec. 15, 1978 [DE] Fed. Rep. of Germany ....... 2854200

[51] Int. Cl.$^3$ ............................................. C01G 25/02
[52] U.S. Cl. .................................. 423/608; 423/81; 423/82; 423/85
[58] Field of Search ...................... 423/81, 82, 85, 608

[56] References Cited

U.S. PATENT DOCUMENTS

| | | | |
|---|---|---|---|
| 2,721,117 | 10/1955 | Schoenlamb | 423/84 |
| 3,445,199 | 5/1969 | Fehr et al. | 423/82 |
| 3,552,914 | 1/1971 | Greinacher et al. | 423/82 |
| 3,832,441 | 8/1974 | Schoenlamb | 423/82 |

FOREIGN PATENT DOCUMENTS

649265 10/1964 Belgium ................................... 423/608

*Primary Examiner*—Herbert T. Carter
*Attorney, Agent, or Firm*—Toren, McGeady & Stanger

[57] ABSTRACT

A method for economically producing high purity zirconium oxide by dissolving calcium zirconate in hydrochloric acid and adjusting the fluorine content of the solution and then mixing this solution with sulfuric acid and heating the mixed solution to a temperature of more than about 80° C. for at least 10 minutes. The resulting suspension is diluted with water and allowed to stand and the precipitate is then filtered, washed and mixed with ammonium carbonate. Carbon dioxide is then passed into the solution, the resulting precipitate is filtered, washed, dried and finally calcined. The zirconium oxide obtained is of sufficiently high purity to be used in the manufacture of electro-ceramics.

5 Claims, No Drawings

PROCESS FOR THE MANUFACTURE OF ZIRCONIUM OXIDE FROM TECHNICAL CALCIUM ZIRCONATE

BACKGROUND OF THE INVENTION

1. Field of the Invention

The invention relates to a process for the manufacture of zirconium oxide which is suitable for the manufacture of electro-ceramics from technical calcium zirconate.

In particular, the invention relates to the manufacture of zirconium oxide which, after conversion into cubic stabilized zirconium oxide, has a high electrical conductivity even at incipient red heat. It may therefore be used, for example, in the manufacture of ceramic test electrodes.

2. Description of the Prior Art

Zirconium oxide which is to be used for the manufacture of electro-ceramics must have a high purity. In particular, the zirconium oxide used for this purpose should contain less than 0.1 weight percent of $SiO_2$, 0.05 weight percent of alkaline earth oxide, 0.05 weight percent of alkali oxide and 0.1 weight percent of $TiO_2$. Otherwise, the physical properties required cannot be obtained.

It is possible to prepare a very pure zirconium tetrachloride by repeated sublimation in an atmosphere of hydrogen and to convert this in a known manner to the oxide. However, this process is too expensive for practical use.

The preparation of solutions of very pure zirconium oxychlorides by the repeated recrystallization of the oxychlorides is also known. This process is also too cumbersome and therefore too expensive for industrial application.

There is, therefore, a definite need for a process for manufacturing zirconium oxide suitable for the aforementioned purposes from an inexpensive raw material of technical purity.

SUMMARY OF THE INVENTION

We have discovered an economical method for obtaining zirconium oxide of high plurity from technical calcium zirconate.

This is accomplished by the following process steps:

(a) dissolving the calcium zirconate in hydrochloric acid, adjusting the fluorine content of the solution to 0.1 to 0.15 moles of fluorine per mole of zirconium by the addition of an alkali or an alkaline earth fluoride and then freeing the solution from insoluble components;

(b) mixing the solution with 0.6 to 0.75 moles of sulfuric acid per mole of zirconium and heating it to temperatures of $\geq 80°$ C. and maintaining this temperature for at least 10 minutes;

(c) diluting the suspension obtained with approximately an equal volume of water, allowing the suspension to stand at least 2 hours, and filtering and washing the precipitate;

(d) mixing the precipitate with an ammonium carbonate solution which contains at least equimolar amounts of ammonium carbonate based on the zirconium;

(e) passing carbon dioxide into this suspension at 20° to 30° C. for at least 30 minutes and filtering, washing and drying the precipitate; and (f) calcining the dried precipitate at 1,000° to 1,100° C.

DESCRIPTION OF THE PREFERRED EMBODIMENT

Technical calcium zirconate may be prepared according to German Pat. No. 23 22 255 by calcining baddeleyite and calcium carbonate. The baddeleyite, having a particle size resulting from the dressing of ore, and calcium carbonate are calcined in a molar ratio of 1:1.05 to 1:1.2 in the presence of 1 to 3 weight percent, based on the total mixture, of calcium fluoride within a temperature range of 1,100° to 1,200° C.

When the calcium zirconate already contains fluorine in an amount required, the addition of an alkali or an alkaline earth fluoride is unnecessary in process step (a) of the present invention. If, however, technical calcium carbonate which is free of fluoride or which contains too small a quantity of fluoride is used, an amount of alkali or alkaline earth fluoride, preferably calcium fluoride, must be added in process step (a) so that the solution contains 0.1 to 0.15 moles of fluoride per mole of zirconium compound.

An process step (a), calcium zirconate is essentially converted into zirconium oxychloride and freed from the components insoluble in hydrochloric acid.

In step (b) of the process, a polysulfato-polyzirconyl acid is precipitated by the addition of 0.6 to 0.75 moles of sulfuric acid per mole of zirconium compound while the solution is heated at $\geq 80°$ C. In order to prevent precipitation after the filtration, the suspension is mixed with about the same volume of water and allowed to stand for at least 2 hours, and preferably for 4 to 5 hours. The polysulfato-polyzirconyl acid is then filtered off and washed.

It is possible to convert this polysulfato-polyzirconyl acid into the oxide by calcining. In so doing, however, $SO_3$ is split off and would have to be absorbed in order to avoid contamination of the environment. Moreover, by calcining in this state, it would not be possible to reduce the calcium content to the extent required for the intended purpose.

The polysulfato-polyzirconyl acid is therefore added to an ammonium carbonate solution is process step (d). This solution should contain at least an equimolar amount, and preferably, however, 1.1 to 1.3 moles, of ammonium carbonate per mole of zirconium compound. This results in the conversion of the polysulfato-polyzirconyl acid to the basic zirconium carbonate. Surprisingly, we have discovered that by passing $CO_2$ at 20° to 30° C., and especially at room temperature, into the solution for at least 30 minutes and preferably, for 1 to 2 hours, the calcium impurities are removed to a high degree from the difficultly soluble, basic zirconium carbonate after it has been filtered and washed. In a last process step, this basic zirconium carbonate is now calcined at 1,000° to 1,000° C.

The zirconium oxide, prepared according to the inventive process, is of high purity. An analysis of the product shows that the impurities present are less than 0.1 weight percent of $SiO_2$, 0.02 weight percent of CaO, 0.01 weight percent of $Fe_2O_3$, 0.1 weight percent of $TiO_2$ and 0.02 weight percent of alkali oxide.

The following example illustrates the present invention.

EXAMPLE

Under stirring, a total of 400 g of technical grade calcium zirconate is added in portions to 750 ml (about 885 g) of concentrated hydrochloric acid in such a manner that, in spite of the vigorous evolution of heat as the zirconate dissolves, the liquid does not foam over. When the addition of the zirconate has been completed, the stirring of the solution is continued at about 90° C. for a further 30 minutes.

800 ml of water are then added in order to prevent the crystallization of zirconium oxychloride during the filtration of the solution. By using a filter aid, a completely clear solution is obtained. A hydrochloric acid solution (1,500 ml) of zirconium oxychloride and calcium chloride is obtained which contains (Zr,Hf)$O_2$ 160 g/l
CaO 77 g/l
Si$O_2$ 1.55 g/l
F 2.1 g/l
Fe$_2$O$_3$ 0.2 g/l.

780 ml of the clear, filtered solution of the technically pure calcium zirconate in hydrochloric acid so obtained is diluted with water to a volume of 1.1 liter. This solution then contains a total of 124.8 g (Zr,Hf)$O_2$ (1 mole); 60 g CaO (1.07 mole); 1.2 g Si$O_2$; 1.6 g F and 0.16 g Fe$_2$O$_3$.

The solution is stirred well, mixed with 60 g of concentrated sulfuric acid and then heated to 90° C. to 95° C. This temperature is maintained for 20 minutes. The volume of the solution is increased to a total of 2 liters by the addition of 0.9 liter of water. The precipitated polysulfato-polyzirconyl acid is allowed to settle.

After 5 to 6 hours, the precipitate can be filtered off and washed with water. The moist filter cake, in a solution of 75 g of ammonium carbonate in 600 ml of water, is freed from sulfate by passing in $CO_2$ at room temperature. The basic zirconium carbonate-hydroxide-hydrate is filtered off, dried and calcined to the oxide at 1,000° to 1,050° C. A pure, hafnium-containing zirconium oxide (98 g) of the following analytical composition is obtained.

Zr$O_2$+Hf$O_2$ 99.9
Si$O_2$ 0.05
CaO <0.02
Fe$_2$O$_3$<0.01
S$O_3$<0.02
Na$_2$O+K$_2$O <0.02
Ti$O_2$<0.05. F<0.02.

What is claimed is:

1. A method for the manufacture of zirconium oxide suitable for the manufacture of electro-ceramics from technical grade calcium zirconate comprising
    (a) dissolving the calcium zirconate in hydrochloric acid, adjusting the fluorine content of the solution to 0.1 to 0.15 moles of fluorine per mole of zirconium by the addition of an alkali or an alkaline earth fluoride and then freeing the solution from insoluble components;
    (b) mixing the solution with 0.6 to 0.75 moles of sulfuric acid per mole of zirconium and heating it to temperatures of ≧80° C. and maintaining this temperature for at least 10 minutes;
    (c) diluting the suspension obtained with approximately an equal volume of water, allowing the suspension to stand at least 2 hours, and filtering and washing the precipitate;
    (d) mixing the precipitate with an ammonium carbonate solution which contains at least equimolar amounts of ammonium carbonate based on the zirconium;
    (e) passing carbon dioxide into this suspension at 20° to 30° C. for at least 30 minutes and filtering, washing and drying the precipitate; and
    (f) calcining the dried precipitate at 1,000° to 1,100° C.

2. The method of claim 1 wherein the diluted suspension is allowed to stand for 4 to 5 hours.

3. The method of claims 1 or 2 wherein the solution in step (d) contains from about 1.1 to 1.3 moles of ammonium carbonate per mole of zirconium compound.

4. The method of claims 1 or 2 wherein the carbon dioxide is passed into the suspension at room temperature in step (e).

5. The method of claims 1 or 2 wherein the carbon dioxide is passed into the suspension for a period of 1 to 2 hours.

* * * * *